United States Patent
McCloskey et al.

(10) Patent No.: US 9,567,917 B2
(45) Date of Patent: Feb. 14, 2017

(54) METHOD FOR CONTROLLING AN ENGINE SYSTEM

(71) Applicant: Perkins Engines Company Limited, Peterborough, Cambridgeshire (GB)

(72) Inventors: James K. McCloskey, Stamford (GB); Siddharth Subhash Gharpure, Peterborough (GB); Stuart P. Smith, Stamford (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 14/731,856

(22) Filed: Jun. 5, 2015

(65) Prior Publication Data

US 2015/0369142 A1    Dec. 24, 2015

(30) Foreign Application Priority Data

Jun. 18, 2014    (GB) .................................. 1410866.6

(51) Int. Cl.
| | |
|---|---|
| F01N 3/00 | (2006.01) |
| F02D 17/04 | (2006.01) |
| F01N 11/00 | (2006.01) |
| F02D 41/04 | (2006.01) |
| F02D 41/14 | (2006.01) |
| F01N 3/20 | (2006.01) |
| F02D 41/02 | (2006.01) |

(52) U.S. Cl.
CPC ............ *F02D 17/04* (2013.01); *F01N 3/2066* (2013.01); *F01N 11/002* (2013.01); *F02D 41/042* (2013.01); *F02D 41/1446* (2013.01); *F01N 2560/06* (2013.01); *F01N 2610/02* (2013.01); *F01N 2610/11* (2013.01); *F01N 2900/0416* (2013.01); *F01N 2900/1404* (2013.01); *F02D 41/0235* (2013.01); *Y02T 10/24* (2013.01); *Y02T 10/47* (2013.01)

(58) Field of Classification Search
USPC ................. 60/274, 276, 277, 286, 295, 297, 298, 60/303, 320
See application file for complete search history.

(56) References Cited

U.S. PATENT DOCUMENTS

| | | | |
|---|---|---|---|
| 6,763,659 B2 | 7/2004 | Watanabe et al. | |
| 7,624,572 B2 | 12/2009 | Lin | |
| 7,832,197 B2 * | 11/2010 | Leone ................. | F02D 13/0219 60/274 |
| 8,011,178 B2 | 9/2011 | Ikeda et al. | |
| 8,240,133 B2 | 8/2012 | Jasinkiewicz et al. | |
| 8,356,472 B2 * | 1/2013 | Hiranuma ............ | F01N 13/009 180/309 |

(Continued)

FOREIGN PATENT DOCUMENTS

| | | |
|---|---|---|
| EP | 2565413 A1 | 3/2013 |
| JP | 2006-274912 A | 10/2006 |
| WO | WO 2013/149717 A1 | 10/2013 |

OTHER PUBLICATIONS

United Kingdom Intellectual Property Office, Search Report in United Kingdom Patent Application No. 1410866.6, Nov. 20, 2014, 1 p.

*Primary Examiner* — Binh Q Tran (57) ABSTRACT

A method is provided for controlling an engine system including an engine, a controller, a clean emissions module (CEM), and a cooling system driven at least partly by the engine system for regulating a temperature of at least part of the CEM.

20 Claims, 3 Drawing Sheets (56) References Cited

U.S. PATENT DOCUMENTS

| | | | |
|---|---|---|---|
| 8,434,295 B2* | 5/2013 | Leone | F01N 3/0842 60/274 |
| 8,453,432 B2 | 6/2013 | Haseyama et al. | |
| 8,789,358 B2* | 7/2014 | Vosz | F01N 3/2073 60/274 |
| 8,844,272 B2* | 9/2014 | Bidner | F01N 3/30 180/65.265 |
| 9,212,582 B2* | 12/2015 | Watanabe | F01N 3/208 |
| 2003/0131589 A1 | 7/2003 | Freisinger et al. | |
| 2009/0043437 A1 | 2/2009 | Shiino | |

\* cited by examiner

METHOD FOR CONTROLLING AN ENGINE SYSTEM

CROSS-REFERENCE TO RELATED APPLICATIONS

This patent application claims the benefit of United Kingdom Patent Application No. 1410866.6, filed Jun. 18, 2014, which is incorporated herein by reference.

TECHNICAL FIELD

The present disclosure relates to a method for controlling an engine system.

BACKGROUND

Temperature plays an important role in an engine system. For example, it is known that certain engine components have an associated optimum temperature range within which they may function. As such, these engine components may have upper temperature limits, above which engine components may begin to malfunction or operate less efficiently. In contrast, there may be lower temperature limits, below which such engine components may not operate very effectively. Accordingly, temperature regulation of an engine system is necessary in order to maintain temperature of engine components within an "operational" temperature range so that the engine system can operate in an efficient and robust manner. In this regard, various cooling systems may be provided within the engine system to assist the temperature regulation, and in particular to effect a cooling of the relevant engine components as the temperatures associated with the engine increase.

It may often be desirable to provide temperature regulation after an engine operator has signalled for the engine to be switched off. Given that the relevant temperature regulation system may be operated at least partly by the engine, an engine control system may prevent or delay the immediate shutdown of the engine (e.g. by performing or maintaining a defined engine operation) after receiving the relevant shutdown signal from the operator so as to maintain the operation of the temperature regulation system. This is often termed "delayed engine shutdown" (DES).

SUMMARY

According to one aspect of the present disclosure, there is provided a method for controlling an engine system, the engine system comprising an internal combustion engine, a controller, a clean emissions module (CEM), and a cooling system driven at least partly by the engine system for regulating a temperature of at least part of the CEM, the method comprising: determining an exhaust gas temperature in the engine system; receiving an engine shutdown signal indicative that the engine is to be shut down; performing, based on the received engine shutdown signal and a determination that the exhaust gas temperature has exceeded a first temperature threshold, a predefined engine operation for the engine system so as to allow temperature regulation by the cooling system; and ceasing the predefined engine operation based on a determination that the exhaust gas temperature has fallen below a second temperature threshold, different to the first temperature threshold.

According to another aspect of the present disclosure, there is provided a computer program product comprising a set of computer-executable instructions, which when run on a computer, cause the computer to: determine an exhaust gas temperature in an engine system at a point downstream from a diesel particulate filter (DPF) of the engine system and upstream of a selective catalytic reduction (SCR) module of the engine system; receive an engine shutdown signal; perform, based on the received engine key-off signal and a determination that the exhaust gas temperature has exceeded an activation temperature threshold, a predefined engine operation for an internal combustion engine of the engine system so as to allow temperature regulation of at least part of the SCR module by a cooling system; and cease the predefined engine operation based on a determination that the exhaust gas temperature has fallen below a deactivation temperature threshold.

BRIEF DESCRIPTION OF THE DRAWINGS

Aspects of the present disclosure will now be described, by way of example only, with reference to the following figures, in which.

DETAILED DESCRIPTION

The present disclosure generally relates to a method, system and computer program for an engine control strategy. The engine control strategy may be employed to assist in temperature regulation of components associated with an engine system and in particular to determine when delayed engine shutdown (DES) should be used and when it should be deactivated so as to appropriately regulate temperatures within the engine system.

Whilst exemplary embodiments of the present disclosure described herein are with reference to a reductant injector such as a diesel exhaust fluid (DEF) injector, it will be appreciated that the principles of the present disclosure may be applied with respect to any component in an engine system for which temperature regulation using a cooling system is desired. More particularly, it will be appreciated that the principles may be applied to any part of a clean emissions module or aftertreatment system for which cooling is desirable during a delayed engine shutdown procedure.

Figure 1:
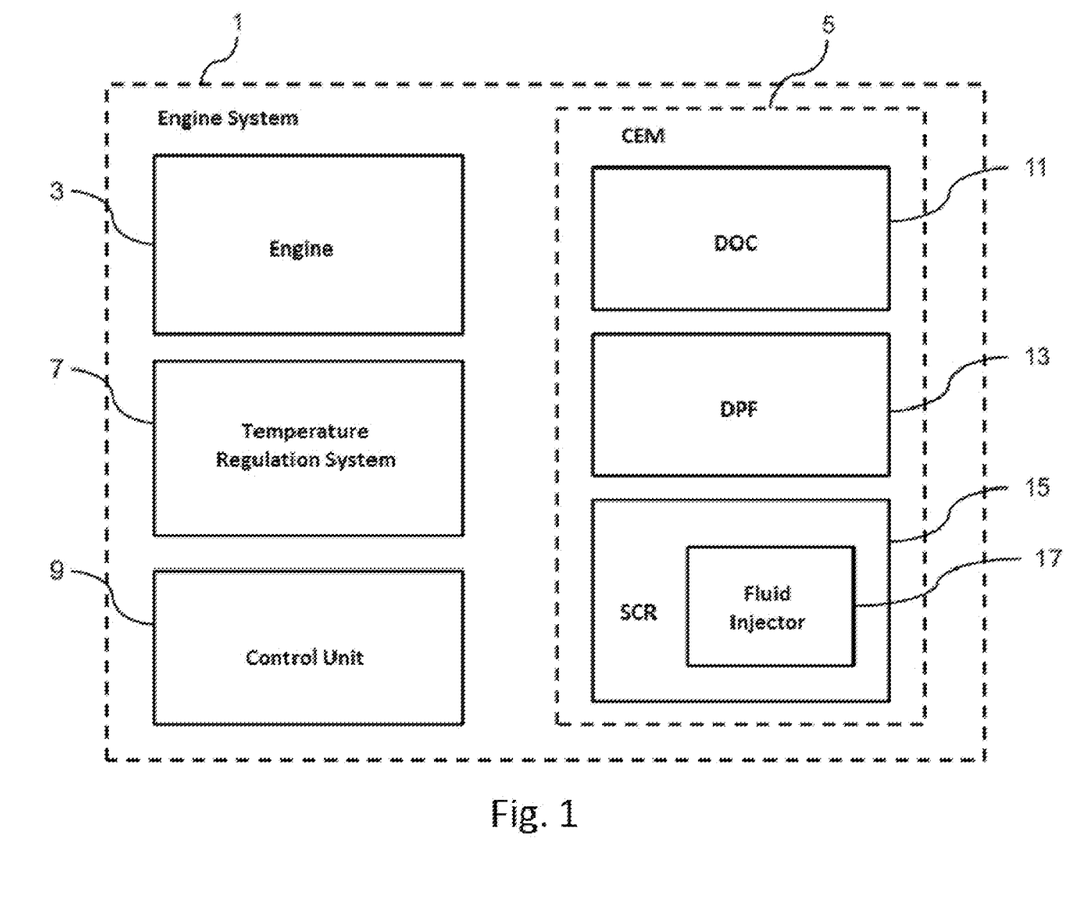
FIG. 1 is a simplified block diagram showing an exemplary engine system to which embodiments of the present disclosure may be applied.

FIG. 1 shows a simplified representation of an example of an engine system 1 to which the control strategy described herein may be applied. The engine system 1 may be part of a machine (not shown). The machine may be any type of machine, for example a transportation vehicle, such as a car, truck, van etc, a heavy equipment vehicle, for example a backhoe loader, bulldozer, tractor, etc, a water irrigator, an electricity generator set, and so forth.

The engine system 1, in this example, comprises an internal combustion engine 3, a clean emissions module (CEM) 5, a temperature regulation system 7 and a control unit 9.

For the purpose of simplified explanation, the internal combustion engine 3 of this example will be understood to be a diesel engine, however, it will be appreciated that the internal combustion engine 3 may comprise one or more (i.e. such as in a "hybrid" engine application) of a diesel engine, a petrol engine, a gas engine and an electric engine.

The CEM 5 may be suitable for treating gases that are exhausted (generally termed "exhaust gas") from the internal combustion engine 3. For example, treatment may comprise reducing the amount of Particulate Matter (PM) and/or Nitrous Oxides (NOX) that are to be exhausted from the engine system 1 to the surrounding environment. In this example, the CEM 5 comprises a Diesel Oxidation Catalyst (DOC) 11, a Diesel Particulate Filter (DPF) 13 and a Selective Catalytic Reduction (SCR) module 15, however it will be appreciated that in other examples, the CEM 5 may comprise fewer or more components (e.g. a DOC and SCR may be provided without any DPF being provided).

The DOC 11 is an exhaust "aftertreatment" device (i.e. that looks to treat exhaust gas after it has exited one or more combustion chambers (not shown) of the internal combustion engine 3. The DOC may, for example, comprise palladium/platinum and aluminium oxide, which may be suitable for oxidising hydrocarbons and carbon monoxide from the exhaust gas into carbon dioxide and water.

The DPF 13 is an exhaust aftertreatment device for removing diesel particulate matter such as soot from the exhaust gas using at least a filtration system.

The SCR module 15 is an exhaust aftertreatment device which uses a catalyst and reductant for converting nitrogen oxides (NOX) into diatomic nitrogen (N2) and water. The SCR module 15 includes a fluid injector 17, which may inject the reductant such as diesel exhaust fluid (DEF) (or any similar solution) into a flow of exhaust gas for the conversion of NOX to occur. As such, the fluid injector 17 may be referred to herein as the "DEF injector" 17. The DEF injector 17 may comprise a DEF injector body (not shown) and a DEF injector tip (not shown). The DEF injector body may surround at least part of the DEF injector tip and may be provided with internal channels to allow coolant to circulate around the DEF injector body (so that the coolant can transfer heat away from the DEF injector).

The temperature regulation system 7 may be provided so as to enable various components in the engine system 1 to be operated within a specified temperature range. The temperature regulation system 7 may comprise at least a cooling system (not shown) that can deliver coolant around a cooling circuit (not shown) so as to regulate the temperature of selected components or parts of the engine system 1. In particular, the cooling system may encompass flow of coolant to and around the DEF injector body via the channels provided in the DEF injector body. Additionally or alternatively, the cooling circuit may comprise the flow of fluid (for example, DEF) through the injector and/or mass flow of exhaust gases around injector tip.

Whilst FIG. 1 shows the various components of the engine system 1 as separate devices, it will be appreciated that this is for the purpose of explanation only and that the various devices may be provided, in some examples, separately as shown, or in other examples, some of the devices may be integrated with one another. For example, the control unit 9 may be provided about the internal combustion engine 3.

Whilst not discussed in detail herein, the temperature regulation system 7 is intended to include temperature regulation mechanisms such as the cooling effects inherently provided by the flow of exhaust gas through the engine system 1 (i.e. heat transfer may occur from engine system components to the exhaust gas as the exhaust gas passes through the engine system). As such, parts of the temperature regulation system 7 may be integrated with the different modules shown in FIG. 1.

In an exemplary embodiment of the present disclosure, the CEM 5 may comprise various modules arranged in a particular manner so that the exhaust gas flowing through the CEM 5 is provided with a flow direction that flows first through the DOC 11, then through the DPF 13 and then through the SCR module 15. Hence the DOC 11 is said to be "upstream" from the DPF 13 and the DPF 13 is "upstream" from the SCR module 15. In other words, the DPF 13 can be said to be "downstream" from the DOC 11, according to the flow direction of the exhaust gas, and the SCR module 15 is "downstream" from the DPF 13.

The temperature regulation system 7 comprises at least one temperature sensor (not shown) positioned proximal to the DPF 13 outlet (i.e. from which exhaust gas exits), downstream from the DPF 13 and upstream from the SCR MODULE 15. The temperature sensor is able to sense and monitor the temperature of the exhaust gas received from the DPF 13 outlet. The temperature sensor is in communication with the control unit 9, which is operable to assist control of the temperature regulation system 7. Further temperature sensors may be positioned at various locations within the engine system 1 for temperature regulation purposes.

The operation of the cooling system may be at least partly driven by operation of the internal combustion engine 3. For example, the cooling system may be provided with a coolant reservoir (not shown) in communication with an electric pump (not shown) that is driven by the internal combustion engine 3. In turn, operation of the internal combustion engine 3 may be controlled by the control unit 9 provided within the engine system 1.

The operation of the control strategy for temperature regulation will now be described with reference to FIG. 2 and FIG. 3.

Figure 2:
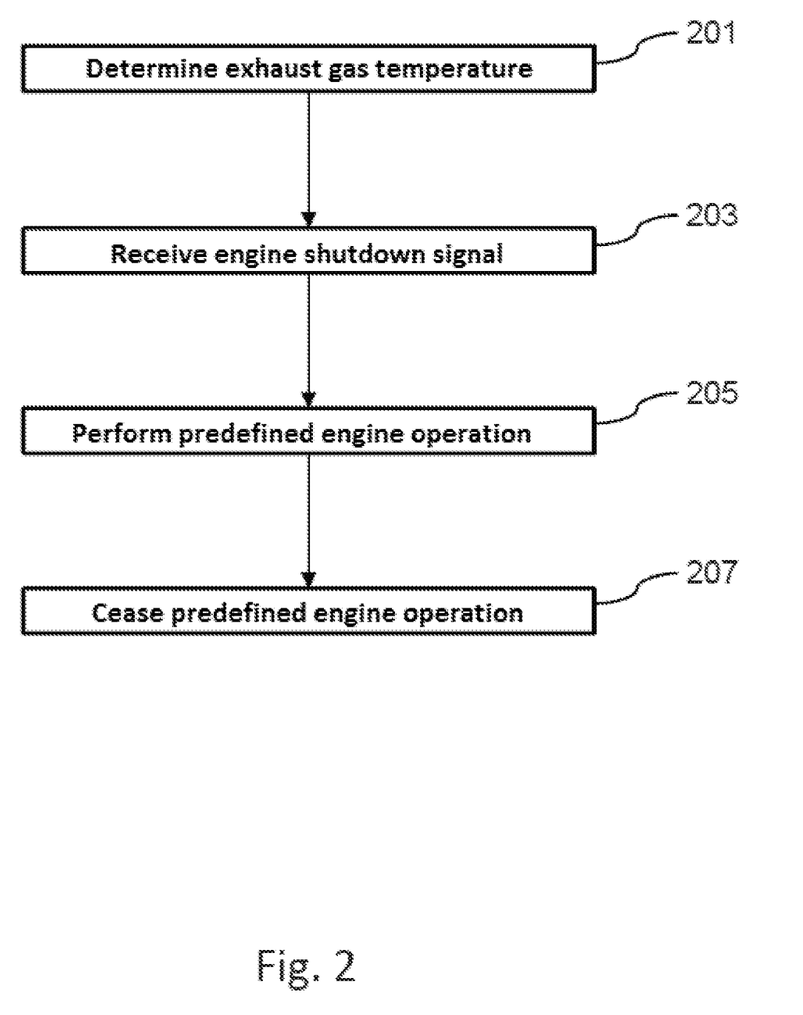
FIG. 2 is flow diagram showing a method according to an exemplary embodiment of the present disclosure.

In particular, FIG. 2 is a flow diagram showing an exemplary embodiment of a method according to the present disclosure. The method is for controlling an engine system, comprising an internal combustion engine, a controller, a clean emissions module (CEM), and a cooling system driven at least partly by the engine system for regulating a temperature of at least part of the CEM. For example, the method may be for controlling the engine system 1 described herein with reference to FIG. 1 or any other engine system having an SCR module 15. The internal combustion engine 3 is presumed to be in operation, for example, by performing an engine operation whereby there is no load or a reduced load provided on the engine.

At step 201, the method may begin by determining an exhaust gas temperature in the engine system. For example, this may be done by the control unit 9 of the engine system 1 using the temperature sensor positioned downstream from the DPF 13 that senses the temperature of the exhaust gas from the DPF 13. In this example, the temperature of the exhaust gas is directly correlated to the temperature of the DEF injector tip (as discussed in detail herein with reference to FIG. 3) and therefore the exhaust gas temperature is representative of the temperature of the DEF injector tip. Such a representative temperature is determined to see whether or not any control strategy needs to be employed for temperature regulation of the DEF injector following an indication of a desire to shutdown the engine 3.

At step 203, the method comprises receiving an engine shutdown signal indicative that the engine is to be shut down. For example, this may be triggered by an operator of the engine 3 indicating their desire to switch off the engine 3. In the example of the engine 3 being provided in a machine system such as a vehicle, this could be the engine/ignition "key-off" signal.

At step 205, the method comprises performing, based on the received engine shutdown signal and a determination that the exhaust gas temperature has exceeded a first temperature threshold, a predefined engine operation for the engine system so as to allow temperature regulation by the cooling system. Accordingly, in the example of having received a "key-off" signal, the engine operation is maintained and the shutdown is prevented or delayed. In other words, the delayed engine shutdown (DES) is activated. For example, the predefined engine operation may be an engine idle operation or a low idle operation. For example, the predefined engine operation may be to operate the engine at 1000 rpm (revolutions per minute).

At step 207, the method comprises ceasing the predefined engine operation based on a determination that the exhaust gas temperature has fallen below a second temperature threshold. The second temperature threshold is different to the first temperature threshold. Therefore, for example, when the control unit 9 determines that the monitored exhaust gas temperature has fallen below the second temperature threshold, the control unit 9 may allow the engine to shutdown. The second temperature threshold may be lower than the first temperature threshold. The first temperature threshold and second temperature threshold may be determined as described herein with reference to FIG. 3 below.

Figure 3:
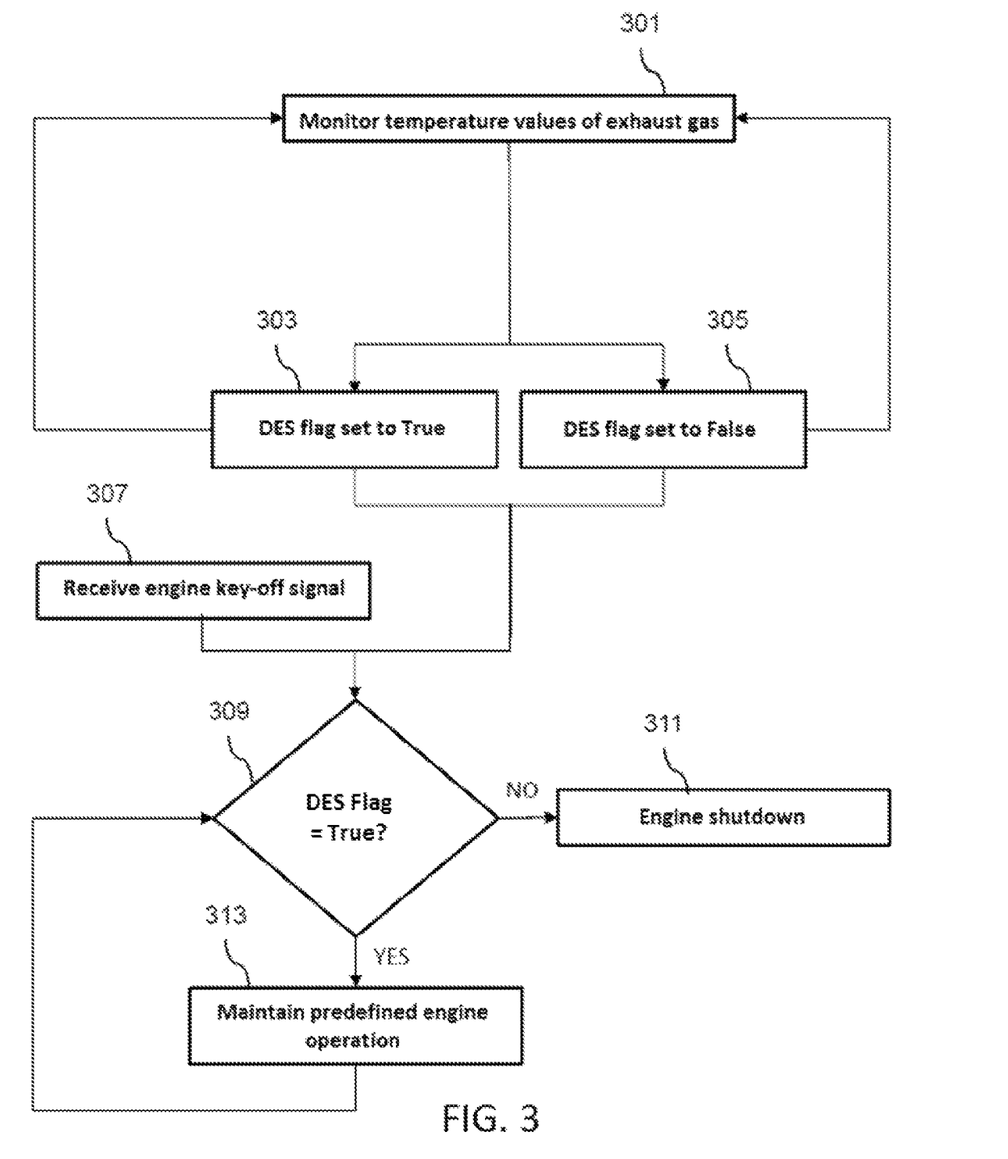
FIG. 3 is a flow diagram showing a method according to another exemplary embodiment of the present disclosure.

FIG. 3 is a flow diagram showing another exemplary embodiment of a method according to the present disclosure. The method of this example is a thermal control strategy that may be used with the engine system 1 described herein with respect to FIG. 1. As with the system described in FIG. 2, the internal combustion engine 3 is assumed to be running and producing exhaust gas. The control strategy is used for controlling the activation and deactivation of delayed engine shutdown (DES) when it is determined that the engine needs to continue running following a shutdown signal. The control of the DES may be for temperature regulation of one or more engine components (i.e. so as to keep one or more cooling systems active).

The at least one temperature sensor positioned downstream of the DPF 13 and upstream of the SCR module 15 senses the temperature of the exhaust gas, EGT, flowing out of the DPF 13 outlet towards an inlet of the SCR module 15. Temperature signals are sent from the at least one temperature sensor to the control unit 9 of the engine system 1.

At step 301, the control unit 9 monitors the temperature values of the exhaust gas received from the at least one temperature sensor. The control unit 9 compares these temperature values to thresholds stored in memory to determine if activation or deactivation of a control flag (termed a "DES flag") is necessary.

In particular, at step 303, if the exhaust gas temperature, EGT, is equal to or above a DES activation temperature threshold, TA, for a predetermined number of counts (i.e. a predetermined time period) then the DES flag is set to TRUE. Setting the DES flag to TRUE activates the DES such that engine operation will continue after receiving a manually activated shutdown signal (e.g. from the engine operator).

If, at step 305, the exhaust gas temperature, EGT, is equal to or falls below a DES deactivation temperature threshold, TD, for a predetermined number of counts (i.e. a predetermined time period) then the DES flag is set to FALSE. Setting the DES flag to FALSE deactivates the DES so that engine operation is allowed to cease following a manually activated shutdown signal being received. The monitoring of the exhaust gas temperature is continuous and the status of the DES flag is continually updated according to steps 301 to 305.

At step 307, an engine key-off signal may be received by the control unit 9 indicating that the engine 3 is to be shut down. For example, this may be a manually activated shutdown signal that is triggered by the operator of the engine system 1.

At this point in time, the process moves on to step 309, in which the control unit 9 determines the status of the DES flag.

If the DES flag is set to FALSE, then the process moves to step 311, whereby the control unit 9 enables the engine 3 to be shutdown.

If, however, a determination is made at step 309 that the DES flag is set to TRUE, then the process moves on to step 313, whereby the control unit 9 is configured to cause the engine to perform or maintain a predefined engine operation, such as an engine idle operation, which operation is continued until the DES flag is determined to have been set to FALSE at step 309.

A computer program product comprising a set of computer-executable instructions is also provided, which when run on a computer causes the computer to perform the method steps described herein. For example, the computer-executable instructions may be run by the control unit 9 described with reference to FIG. 1.

INDUSTRIAL APPLICABILITY

The method described herein with reference to FIGS. 1 to 3 may be implemented in an engine system, for example a diesel-based engine system having a CEM comprising a DOC, a DPF and a SCR module. The engine system may form part of a machine system, for example a vehicle system.

It has been found through trials that the exhaust gas temperatures have a direct relationship with the DEF injector tip temperatures. Accordingly, in the examples discussed herein with reference to FIGS. 1 to 3, the temperature measurement of exhaust gas in the engine system 1 is used in order to predict the temperature of the DEF injector tip. This is because accurate direct measurement of the DEF injector tip during engine operation is difficult and so the monitored exhaust gas temperature is used instead to represent the DEF injector tip temperature.

The monitoring of the DEF injector tip temperature is required due to the DEF injector having an operational temperature threshold above which cooling is required in order to maintain efficient operation of the DEF injector. In this regard, it has been found that the exhaust gas temperature can be monitored to determine when the DEF injector tip temperature is expected to be above the operational temperature threshold such that cooling would be required prior to engine shutdown. Thus, if the predicted injector tip temperature (according to the measured exhaust gas temperature) is determined to be above the operational temperature threshold then DES may be used to ensure engine shutdown is delayed to allow appropriate cooling to be applied to the DEF injector.

It has been appreciated that the relationship between exhaust gas temperature and DEF injector tip temperature can change according to different operational modes of the engine system. With this in mind, it has been appreciated that the exhaust gas temperature which correlates to a specific DEF injector tip temperature will vary according to different operational modes of the engine system.

In more detail, it has been appreciated that the relationship between such temperatures is different when a high temperature regeneration operation has taken place compared with when no such high temperature regeneration has taken place. High temperature regeneration is essentially a strategy that is used to increase the temperature of the DPF 13 so as to regenerate or clear the DPF and also elevate exhaust temperature so as to regenerate the SCR catalyst (to remove sulphation or DEF deposit formation, thereby improving NOX conversion performance). There are various methods used to effect such a temperature increase, such as by injecting hydrocarbons upstream of the DPF 13 so that the temperature of the DPF 13 increases due to combustion of the hydrocarbons at the DPF 13 (often termed "HC dosing").

Following an HC dosing operation, the heated components around the DEF injector have been found to significantly contribute to the temperature of the DEF injector tip. In contrast, following a "normal" engine operation (i.e. no HC dosing), the surrounding components around the DEF injector have been found not to contribute to the DEF injector tip temperature as significantly. Consequently, following an HC dosing operation, the DEF injector tip stays hotter for longer during DES as the exhaust gas temperature decreases compared with the temperature of the DEF injector tip following normal engine operation, which drops more rapidly along with the exhaust gas temperature.

The temperature relationships between the DEF injector tip and exhaust gas temperature during DES can be graphically illustrated to provide a "cooling curve", which shows how the temperatures correlate with one another. Accordingly, a first cooling curve may represent the correlation of values between exhaust gas temperature and DEF injector tip temperature during an engine idle operation (i.e. the normal engine operation scenario). A second cooling curve may have a different gradient to the first cooling curve and may represent the correlation of values between exhaust gas temperature and DEF injector tip temperature following a change from an HC dosing operation to the engine idle operation.

To describe this numerically, during DES following an HC dosing operation, the injector tip temperature may eventually drop to an operational temperature threshold (above which cooling is required) of 140° C., and this may equate to an exhaust gas temperature (at the DPF outlet) of around 250° C. In contrast, during DES following normal engine operation (i.e. no HC dosing), the exhaust gas temperature is found to be at the higher temperature of 370° C. when the DEF injector tip has cooled to 140° C. (because the components surrounding the DEF injector do not contribute to the temperature of the DEF injector tip as significantly as they do following an HC dosing operation and so the DEF injector tip cools quicker).

Given these scenarios, it can be seen that the DES may only require activation when exhaust gas temperatures have risen above 370° C. This is because, for the normal engine operation, exhaust gas temperatures below 370° C. are representative of DEF injector tip below 140° C. for which cooling is not required. As for the HC dosing engine operation, such an operation will inevitably cause exhaust gas temperatures to rise above 370° C. and will accordingly always activate DES. Whilst the suggested deactivation temperature for the normal operation scenario would also be around 370° C., in order to account for the HC dosing scenario, DES may be deactivated when exhaust gas temperatures have been determined to fall below 250° C.

In this regard, the use of an activation temperature threshold for DES that is separate from a deactivation temperature threshold means that the DES is only activated when needed and will stay operational until it is not required. This is, for example, in contrast to a single temperature threshold that may be selected based on a typical "high temperature" scenario (such as the HC dosing scenario), which may cause frequent activation of DES when it is not required. More particularly, as described herein, whilst using a temperature threshold of 250° C. for deactivation of DES may allow for cooling of the DEF injector tip to 140° C. following an HC dosing operation, using the same temperature threshold for the activation of DES may activate DES when it is not required (i.e. during normal engine operation, DES activation is only required for exhaust gas temperatures above 370° C.).

Whilst embodiments of the present disclosure described herein provide examples of activation and deactivation temperatures for DES, it will be appreciated that such temperature values may be selected from a range of temperature values depending on various factors such as engine configuration. For example, the first temperature threshold may be selected to have a value in a temperature range of between 300° C. and 500° C., and the second temperature threshold may be selected to have a value in a temperature range of between 200° C. and 300° C.

The invention claimed is:

1. A method for controlling an engine system, the engine system comprising an internal combustion engine, a controller, a clean emissions module (CEM), and a cooling system driven at least partly by the engine system for regulating a temperature of at least part of the CEM, the method comprising:
   determining an exhaust gas temperature in the engine system;
   receiving an engine shutdown signal indicative that the engine is to be shut down;
   performing, based on the received engine shutdown signal and a determination that the exhaust gas temperature has exceeded a first temperature threshold, a predefined engine operation for the engine system so as to allow temperature regulation by the cooling system; and
   ceasing the predefined engine operation based on a determination that the exhaust gas temperature has fallen below a second temperature threshold, different to the first temperature threshold.

2. A method according to claim 1, wherein the first temperature threshold is higher than the second temperature threshold.

3. A method according to claim 1, wherein the first temperature threshold is selected so as to represent a predetermined operational temperature of a fluid injector of the clean emissions module based on a first operational condition of the engine system, and wherein the second temperature threshold is selected so as to represent the predetermined operational temperature of the fluid injector based on a second operational condition of the engine system.

4. A method according to claim 3, wherein the first temperature threshold is selected based on a cooling curve representing a correlation of values between the exhaust gas temperatures and the fluid injector temperature following the predefined engine operation.

5. A method according to claim 3, wherein the second temperature threshold is selected based on a cooling curve representing a correlation of values between the exhaust gas temperatures and the fluid injector temperature following a change from a high temperature regeneration engine operation to the predefined engine operation.

6. A method according to claim 1, wherein the predefined engine operation is performed when it has been determined that the exhaust gas temperature has exceeded the first temperature threshold for a predetermined time period.

7. A method according to claim 1, wherein the ceasing of the predefined engine operation occurs when it is determined that the monitored exhaust as temperature is below the second temperature threshold for a predetermined time period.

8. A method according to claim 1, wherein the first temperature threshold is selected to have a value in a temperature range of between 300° C. and 500° C.

9. A method according to claim 8, wherein the first temperature threshold is approximately 370° C.

10. A method according to claim 1, wherein the second temperature threshold is selected to have a value in a temperature range of between 200° C. and 300° C.

11. A method according to claim 10, wherein the second temperature threshold for ceasing the predefined engine operation is approximately 250° C.

12. A method according to claim 1, wherein ceasing the predefined engine operation comprises shutting down the internal combustion engine so that operation of the cooling system ceases.

13. A method according to claim 1, wherein the predefined engine operation is an engine idle operation.

14. A computer program product comprising a set of computer-executable instructions, which when run on a computer, cause the computer to:
   determine an exhaust gas temperature in an engine system at a point downstream from a diesel particulate filter (DPF) of the engine system and upstream of a selective catalytic reduction (SCR) module of the engine system;
   receive an engine key-off signal;
   perform, based on the received engine key-off signal and a determination that the exhaust gas temperature has exceeded an activation temperature threshold, a predefined engine operation for an internal combustion engine of the engine system so as to allow temperature regulation of at least part of the SCR module by a cooling system; and
   cease the predefined engine operation based on a determination that the exhaust gas temperature has fallen below a deactivation temperature threshold;
   wherein the activation temperature threshold is different to the deactivation temperature threshold.

15. A method according to claim 2, wherein the first temperature threshold is selected so as to represent a predetermined operational temperature of a fluid injector of the clean emissions module based on a first operational condition of the engine system, and wherein the second temperature threshold is selected so as to represent the predetermined operational temperature of the fluid injector based on a second operational condition of the engine system.

16. A method according to claim 4, wherein the second temperature threshold is selected based on a cooling curve representing a correlation of values between the exhaust gas temperatures and the fluid injector temperature following a change from a high temperature regeneration engine operation to the predefined engine operation.

17. A method according to claim 2, wherein the predefined engine operation is performed when it has been determined that the exhaust gas temperature has exceeded the first temperature threshold for a predetermined time period.

18. A method according to claim 2, wherein the ceasing of the predefined engine operation occurs when it is determined that the monitored exhaust gas temperature is below the second temperature threshold for a predetermined time period.

19. A method according to claim 2, wherein the first temperature threshold is selected to have a value in a temperature range of between 300° C. and 500° C.

20. A method according to claim 2, wherein the second temperature threshold is selected to have a value in a temperature range of between 200° C. and 300° C.

* * * * *

UNITED STATES PATENT AND TRADEMARK OFFICE
CERTIFICATE OF CORRECTION

PATENT NO. : 9,567,917 B2
APPLICATION NO. : 14/731856
DATED : February 14, 2017
INVENTOR(S) : McCloskey et al.

Page 1 of 1

It is certified that error appears in the above-identified patent and that said Letters Patent is hereby corrected as shown below:

In the Claims

Column 9, Line 7, In Claim 7, delete "exhaust as" and insert -- exhaust gas --.

Signed and Sealed this
Ninth Day of May, 2017

Michelle K. Lee
*Director of the United States Patent and Trademark Office*